United States Patent [19]

Sokolow

[11] 3,945,622

[45] Mar. 23, 1976

[54] CASCADE TYPE DYNAMIC MIXER FOR EXTRUSION OF PLASTIC

[75] Inventor: Nickolas N. Sokolow, Roscoe, Ill.

[73] Assignee: Beloit Corporation, Beloit, Wis.

[22] Filed: Aug. 26, 1974

[21] Appl. No.: 500,333

[52] U.S. Cl. .............................................. 259/191
[51] Int. Cl.² .......................................... B01F 7/08
[58] Field of Search ......... 259/191, 192, 193, 9, 10, 259/97, 25, 26, 45, 46; 425/208, 207, 209

[56] References Cited
UNITED STATES PATENTS

| | | | |
|---|---|---|---|
| 2,631,016 | 3/1953 | Kraffe .................................. | 259/192 |
| 3,687,423 | 8/1972 | Koch .................................... | 259/191 |
| 3,719,351 | 3/1973 | Upmeier ............................. | 259/191 |
| 3,721,427 | 3/1973 | Upmeier ............................. | 259/191 |

Primary Examiner—Robert W. Jenkins
Attorney, Agent, or Firm—Hill, Gross, Simpson, Van Santen, Steadman, Chiara & Simpson

[57] ABSTRACT

A cascade type dynamic mixer for extrusion of plastic comprises extruder screw means to advance a thermoplastic resin material through a hollow barrel, and having a mixing section along a length thereof provided with a plurality of encircling barrier rings in axially spaced relation therealong. The rings have localized high shear cascade areas which are graduated to pass progressively smaller size particles along the mixing section. On each ring, undulations provide alternating plastic advancing and reversing flight lengths, the shear areas being on the reversing flight lengths which are shallower than the plastic advancing flight lengths and progressively higher in each ring downstream along the mixing section.

10 Claims, 8 Drawing Figures

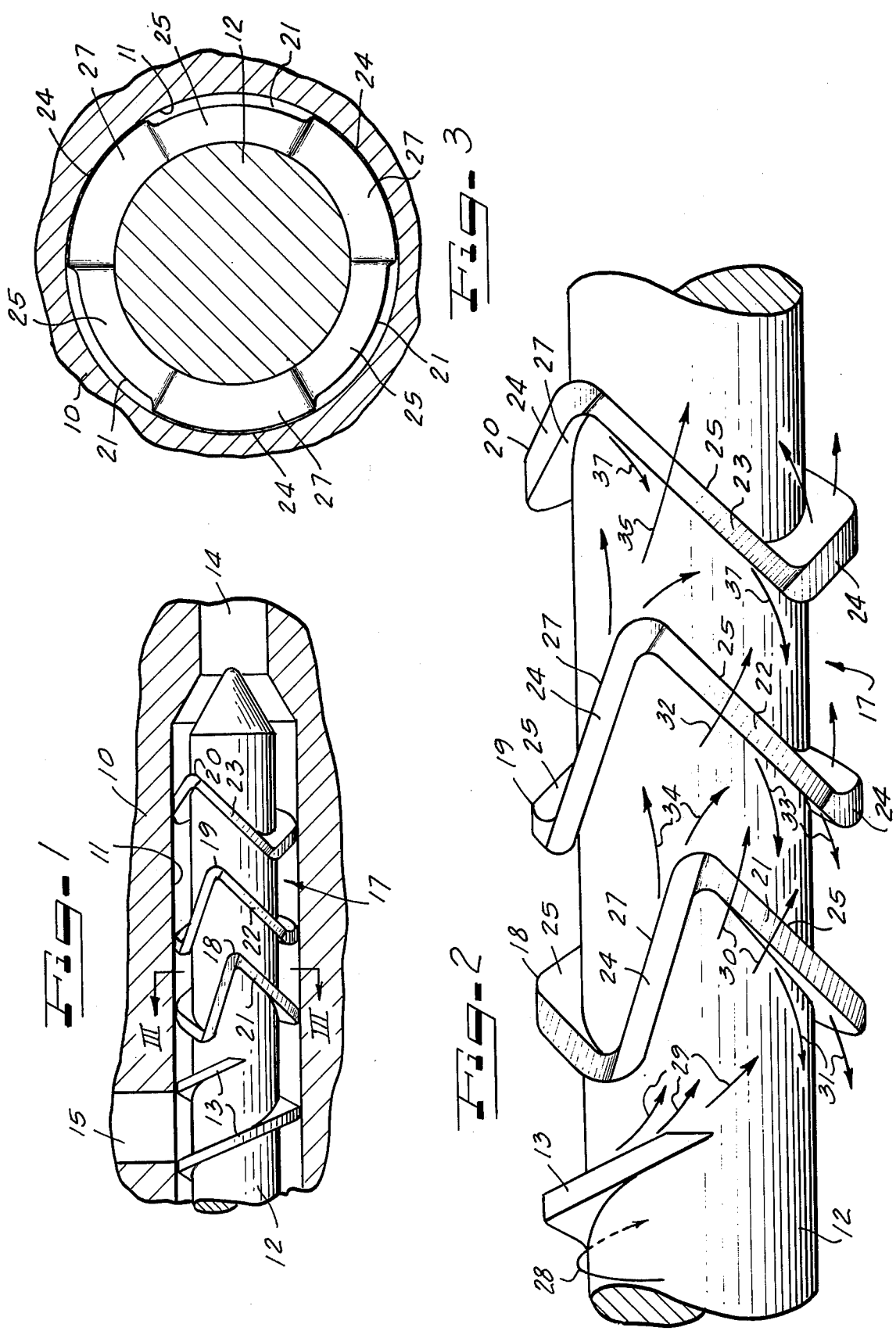

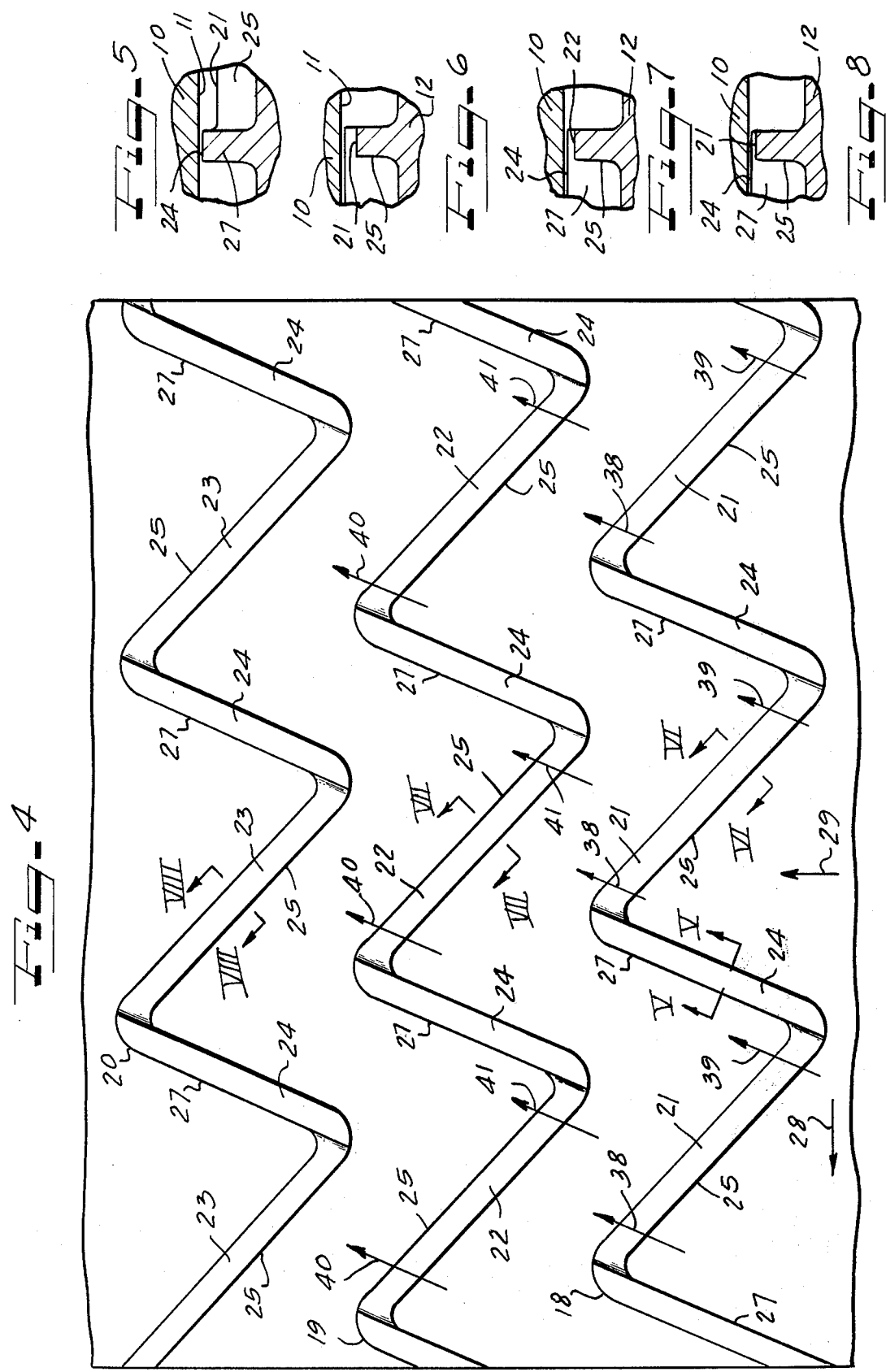

CASCADE TYPE DYNAMIC MIXER FOR EXTRUSION OF PLASTIC

This invention relates to improvements in plastic extruders, and is more particularly concerned with a new and improved cascade type dynamic mixer for enhancing the product quality and performance in plastic extrusion.

A well known problem in the extrusion of resinous thermoplastic materials is the attainment of satisfactorily uniform melt and mixing of the particles or granules supplied to the extruders. In a common form, such extruders comprise a hollow barrel within which the plastic material is heated for fluxing and a helical screw mixes and advances the material toward an outlet such as an extrusion die or nozzle. Some high molecular weight particles frequently resist melting while propelled through the heated passage within the extruder and therefore various screw supplements to improve melt quality have been proposed, sometimes referred to as mixing sections, to work the material and subject it to shearing action. Among such mixing sections are those referred to as of the barrier type. The simplest form of this type of mixing section includes a ring sometimes referred to as a blister. A fairly elaborate example of a prior structure of this type is disclosed in U.S. Pat. No. 3,486,192 in which alternate closed end grooves or flutes are provided along the mixing section. While such arrangements improve mixing, they also considerably decrease output. A major deficiency of such prior arrangements has been that there is a tendency for solid particles to lodge upstream along the barrier and create a plugged-up condition.

It is an important object of the present invention to provide a new and improved cascade type dynamic mixer which will overcome the foregoing and other disadvantages, deficiencies, inefficiencies, shortcomings and problems or prior devices and attain uniform mixing and fluxing of thermoplastic material in an extruder.

According to the principles of the present invention, there is provided a cascade dynamic mixer for extrusion of plastic comprising a mixing section along a length of screw means adapted to advance thermoplastic resin material through a hollow barrel toward an outlet, and wherein the mixer section has a plurality of encircling barrier rings in axially spaced relation therealong, such rings having respective localized high shear cascade areas which are graduated to pass particles of progressively smaller size in the direction of plastic advance along the mixing section.

As another features of the invention, each ring has undulations which provide alternating plastic advancing and reversing flight lengths, the shear areas being on the reversing flight lengths which are shallower than the plastic advancing flight lengths and progressively higher in each ring downstream along the mixing section. This arrangement according to the present invention is such that particles which are too large to pass the successive barriers are subjected to dynamic mixing upstream from the restraining barrier until they have melted to a size to pass the shear areas of such barriers. This action progresses along the mixing section until thorough fluxing of the plastic material is complete, all without any flow stagnation.

Other objects, features and advantages of the invention will be readily apparent from the following description of a preferred embodiment thereof, taken in conjunction with the accompanying drawings although variations and modifications may be effected without departing from the spirit and scope of the novel concepts embodied in the disclosure, and in which:

FIG. 1 is a fragmentary longitudinal sectional elevational view through an extruder embodying features of the invention;

FIG. 2 is an enlarged fragmentary view of the mixing section along the extruder screw;

FIG. 3 is an enlarged fragmentary sectional detail view taken substantially along the line III—III of FIG. 1;

FIG. 4 is a developed plan view of the mixing section; and

FIGS. 5 to 8, inclusive, are respectively fragmentary sectional detail views taken substantially along the lines V—V, VI—VI-, VII—VII, and VIII—VIII in FIG. 4.

Referring to FIG. 1, a typical extruder such as may be employed for injecting fluent plastic material into an injection molding die includes a hollow tubular barrel 10 having therein a cylindrical inner wall 11 within which an extruder screw 12 having one or more flights on helical threads 13 advances plastic material which has been fed into the barrel at a suitable point upstream toward a reduced diameter outlet or nozzle passage 14. At a suitable point upstream from the discharge outlet a vent 15 may be provided for drawing off volatile components from within the barrel.

According to the present invention, a cascade type dynamic mixer comprising a mixing section 17 is provided along a suitable length of the screw means provided by the screw 12. Desirably the mixing section 17 is located on the terminal end portion of the screw 12 and may be separately formed and attached structure or may be formed in one piece with the shaft of the screw 12. In any event, the mixing section 17 is functionally integral with the screw 12 and receives the plastic material from the forward end of the spiral thread means 13 of the screw. Whereas up to this point the plastics material will have undergone substantial fluxing and mixing, a substantial proportion of unfluxed particles may still be present, and it is to the elimination of such particles that the mixing section 17 is provided. In advancing along the mixing section 17, the heated plastic material must pass a plurality of encircling barrier rings, herein three in number and identified as 18, 19 and 20, respectively, in axially spaced relation along the mixing section. All of the barrier rings are preferably of substantially the same structure and they may be located at equally spaced intervals along the mixing section 17, although if preferred a differential spacing may be employed. Each of the barrier rings has a circumference which in part closely approaches the inner wall 11 of the barrel and which circumference is in part shallower to provide circumferentially uniform depth narrow gap relative to the barrel inner wall, the gaps providing respective localized high shear cascade areas, comprising areas 21 on the ring 18, areas 22 on the ring 19 and areas 23 on the ring 20. As best seen in reference to FIGS. 3 and 4, each of the barrier rings in a typical installation may have three equally spaced shear cascade areas. Each of the shear cascade areas is shallower than the remainder of the respective barrier ring, with full diameter areas 24 separating the shear areas. Desirably the shear areas 21, 22 and 23 are circumferentially longer than the intervening areas 24 of the barrier rings. Improved mixing and plastic advancing action is attained by having the barrier rings 18, 19 and 20 of undulant form wherein the cascade areas 21, 22 and 23 are provided on what may be considered reverse flight lenghts 25 of the barrier rings and the intervening areas 24 are provided on plastic material advancing flight lengths 27.

In operation of the extruder screw 12, it rotates in the direction of the arrow 28 in FIGS. 2 and 4. Thermoplastic material is accordingly advanced by the screw threads 13, as indicated by the directional arrows 29, toward the mixing section 17. Along the mixing section 17, the thermoplastic material is compelled to advance across the shear cascade areas 21, 22 and 23 which are of graduated recessed depths in the barrier rings 18, 19 and 20, respectively, to pass particles of progressively smaller size in the direction of plastic advance along the mixing section, the intervening barrier ring areas 24 being on a diameter close to that of the barrel wall 11 (FIGS. 3 and 5) and serving as scrapers. In a desirable arrangement, the cascade gaps provided by the areas 21, 22 and 23 diminish relative to one another progressively downstream by about one-half. By way of example, the areas 21 may be of a depth in the ring 18 which will provide with the barrel wall 11 a gap of about 0.060 inch (FIGS. 3 and 6), while the areas 22 in the ring 19 may be of a depth to provide a gap of about 0.030 inch (FIG. 7) and the areas 23 in the ring 20 may be of a depth to provide a gap of about 0.015 inch (FIG. 8).

Melted thermoplastic material advanced along the screw 12 toward the first barrier ring 18 in the series can flow with substantial freedom across the barrier areas 21 as indicated by directional arrows 30 in FIG. 2. However, unmelted particles of larger than 0.060 inch will be held back by the reverse flights 25 of the ring 18 as indicated by the directional arrows 31 in FIG. 2 and propelled in reverse into the advancing stream of thermoplastic material, and in effect circulating at the upstream side of the barrier ring 18 until the oversize particles have melted down sufficiently to pass the gap across the shear cascade areas 21. By virtue of the dynamic propulsion effect of the screw threads 13 and the reversing effect of the reverse flights 25 of the barrier ring 18, the oversize particles are maintained in constant agitation and will not stagnate along the upstream side of the barrier ring 18.

Thermoplastic material which advances past the barrier ring 18 moves on toward the barrier ring 19 which is next in the series, and except for unmelted particles which are oversize relative to the depth of the gap across the shear cascade areas 22 will move on over and past the cascade ring 19 as indicated by the directional arrow 32 in FIG. 2. Particles of a size greater than the depth of the gap at the shear cascade areas 22 are shunted in reverse as indicated by the directional arrows 33 in FIG. 2 into the material advancing toward the barrier ring 19. Propulsion advance of the thermoplastic material from the barrier ring 18 toward the barrier 19 is effected by the propelling flights 27 of the barrier ring 18 as indicated by the directional arrows 34 in FIG. 2.

Thermoplastic material advancing past the barrier ring 19 moves toward the final barrier ring 20 in the series, the suitably fluxed thermoplastic material moving on over the shear cascade areas 23 as indicated by the directional arrow 35 in FIG. 2, particles of plastic oversize relative to the shear gap over the areas 23 being shunted in reverse as indicated by the arrows 37, and the driving flights 27 of the ring 19 providing impelling force to the thermoplastic material. Downstream from the barrier ring 20, the thermoplastic material is propelled onward by the driving flights 27 of the ring 20 to move on toward and into the outlet 14.

By the arrangement of the barrier rings 18, 19 and 20 wherein their shear cascade areas are of respectively decreasing clearance in serial progression, each barrier stage in effect filters a predetermined range of particle sizes against advancing to the next stage until ultimately the minimum clearance stage at the ring 20 is reached where the ultimate highest shear and maximum mixing takes place along the mixing section 17. This avoids plugging the final stage and minimum clearance shear cascade areas.

In each progressive stage along the mixing section 17, the action of the reverse flights 25 effects a pushing back of solid particles of the thermoplastic material too large to pass the associated shear cascade areas, in a rhythmic, pulsating manner until the pushed back particles are reduced in size by fluxing action of the applied heat and can pass the barrier to undergo further size reduction at the next barrier stage. This rhythmic pusating action on the overside particles at each stage contributes to mixing of the melt as well as facilitating fluxing of the material.

In effect, the shorter connecting intermediate fight lengths 27 may be considered as extensions of the main material advancing helical thread flight 13 of the screw 12 since the flight lengths 27 act to drive the thermoplastic material in substantially the same direction and function in much the same way as the screw flight proper. Onward driving action of the flight lengths 27 may be considered as a substantial pumping action which compensates for any restrictive losses due to the filtering action of the shear cascade areas at the several stages along the mixing section 17. By virtue of their alternate relation to the reverse action flights 25, mixing of the thermoplastic material melt by the flights 27 is vigorous and eliminates flow stagnation.

By arranging the undulations of the barrier ring 19 so that the upstream apices at juncture of the flight lengths 25 and 27 thereof are about opposite the midpoint of the length of the shear cascade areas 21 of the ring 18, flow over the areas 21 will split, with part of the flow going toward the aligned areas 22 on the ring 19, as indicated by directional arrows 38 in FIG. 4, and part of the thermoplastic material stream flowing toward the next adjacent off-running side shear cascade areas 22 of the ring 19, as indicated by the directional arrows 39 and mixing with the part of the stream indicated by the arrows 38 of the corresponding off-running side adjacent area 21. To the same effect, thermoplastic material passing over the shear cascade areas 22 will split and flow as indicated by the directional arrows 40 to move part of the stream toward the aligned shear cascade areas 23 of the barrier ring 20, while another portion of the stream is directed toward and mixes with the stream from the shear area 22 at the off-running side, as indicated by the directional arrows 41. Such redistribution of the advancing thermoplastic material substantially contributes to the mixing action.

It will be understood that variations and modifications may be effected without departing from the spirit and scope of the novel concepts of this invention.

I claim as my invention:

1. A cascade type dynamic mixer comprising a mixing section along a length of screw means adapted to advance thermoplastic resin material through a hollow barrel toward an outlet, having the improvement comprising:

said section provided with a plurality of encircling barrier rings in axially spaced relation therealon; and each of said rings having a circumference which in part will closely approach an inner wall of the barrel and which circumference is in part shallower to provide substantially uniform depth narrow gap relative to the barrel inner wall, the shallower parts of the ring circumferences providing respective localized high shear cascade areas which are of progressively shallower depth in the successive rings downstream along the mixing section whereby to pass particles of progressively smaller size in the direction of plastic advance along said mixing section.

2. A mixer according to claim 1, wherein said barrier rings are of undulant form providing reverse flight lengths defining said high shear areas, and intervening thermoplastic material advancing flight lengths.

3. A mixer according to claim 1, wherein each of said rings has a plurality of the localized high shear cascade areas separated by intervening scraper areas of larger diameter than the cascade areas and cooperative with the barrel inner wall to compel passing of advancing thermoplastic material over the cascade areas.

4. A mixer according to claim 1, wherein each of the rings has a plurality of the cascade areas separated in each ring by intervening plurality of areas of the ring which are on a larger diameter approximating the diameter of the barrel inner wall, the cascade areas being about half as deep downstream as the cascade areas upstream on the rings along the mixing section.

5. A mixing section according to claim 1, including three of the barrier rings, said shear areas being recessed in the tops of said rings, the recess depth of the areas in the first of said rings in the path of the advancing thermoplastic resin material being twice as deep as the areas in the second of the rings considered in the direction of advance of the material, and the areas on the third of the rings in the direction of advance of the thermoplastic material being half as deep as the areas on the second ring.

6. A mixer according to claim 1, wherein said barrier rings are of undulating form having reverse flight lengths on which said high shear areas are located and material advancing intermediate flight lengths, said lengths joining at respective apices, the upstream apices of the flight lengths of the barrier rings being located generally aligned with the center of the high shear areas of the barrier rings located upstream therefrom.

7. A cascade type dynamic mixer according to claim 1, in combination with a hollow barrel having a cylindrical inner wall, said screw means including a helical flight upstream from the mixing section for advancing the thermoplastic resin material toward the mixing section, said barrier rings including means providing a pumping action to promote advance of the thermoplastic material along the mixing section.

8. A combination according to claim 7, wherein said barrier rings are of undulating shape having angularly related reversing flight lengths associated with said high shear areas, and intervening pumping flight lengths.

9. A combination according to claim 8, wherein said pumping flight lengths provide scrapers cooperating with the barrel wall, and said high shear areas associated with the reversing flight lengths define said high shear areas with said wall.

10. A combination according to claim 9, wherein the high shear areas downstream diminish by about one-half relative to upstream areas provided by the high shear areas of the rings.

* * * * *